Oct. 5, 1926.
J. F. CULLEN
1,601,999
TREAD CUTTING MACHINE FOR TIRE MOLDS
Filed April 13, 1925    6 Sheets-Sheet 6
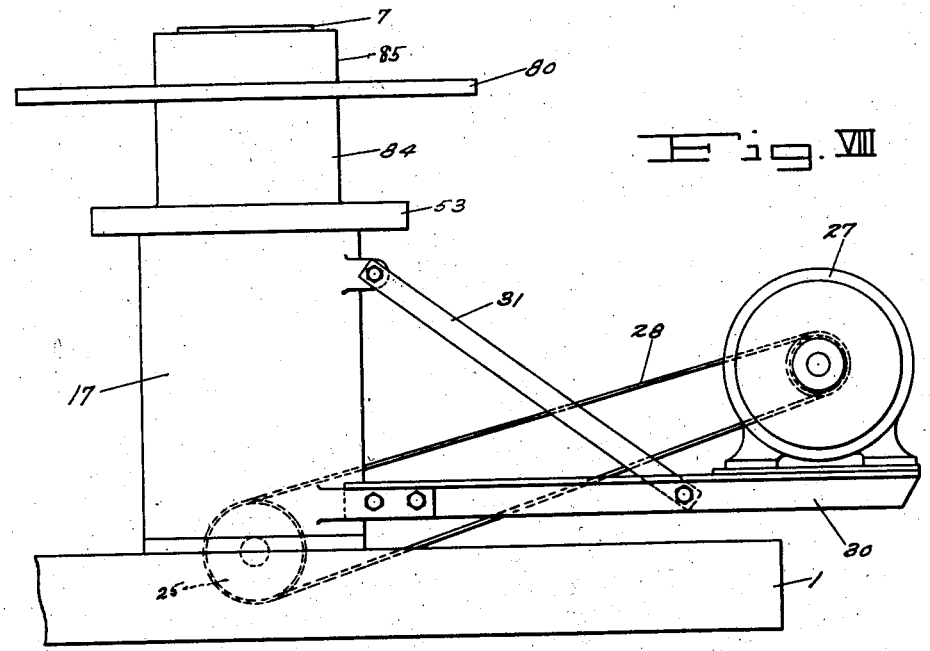
Fig. VIII
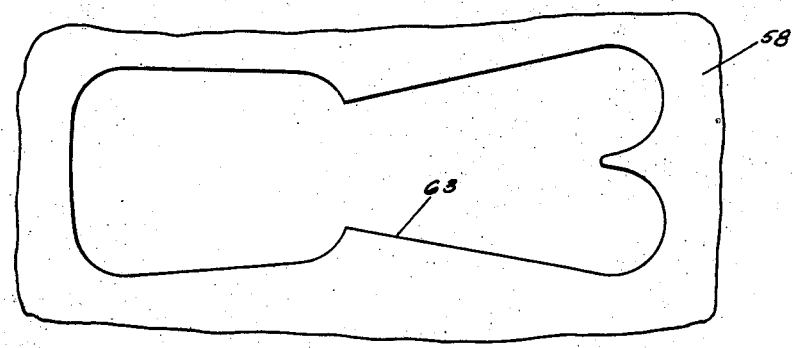
Fig. IX
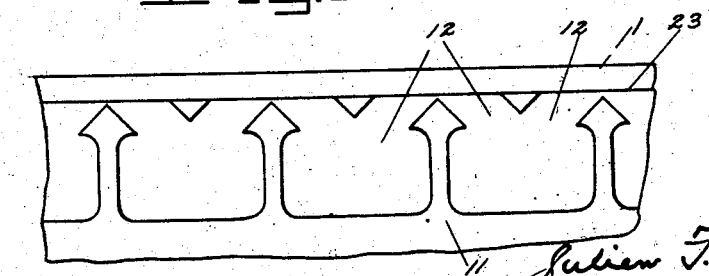
Fig. X
Inventor:
Julien F. Cullen,
By Atkins & Atkins,
Attorneys.

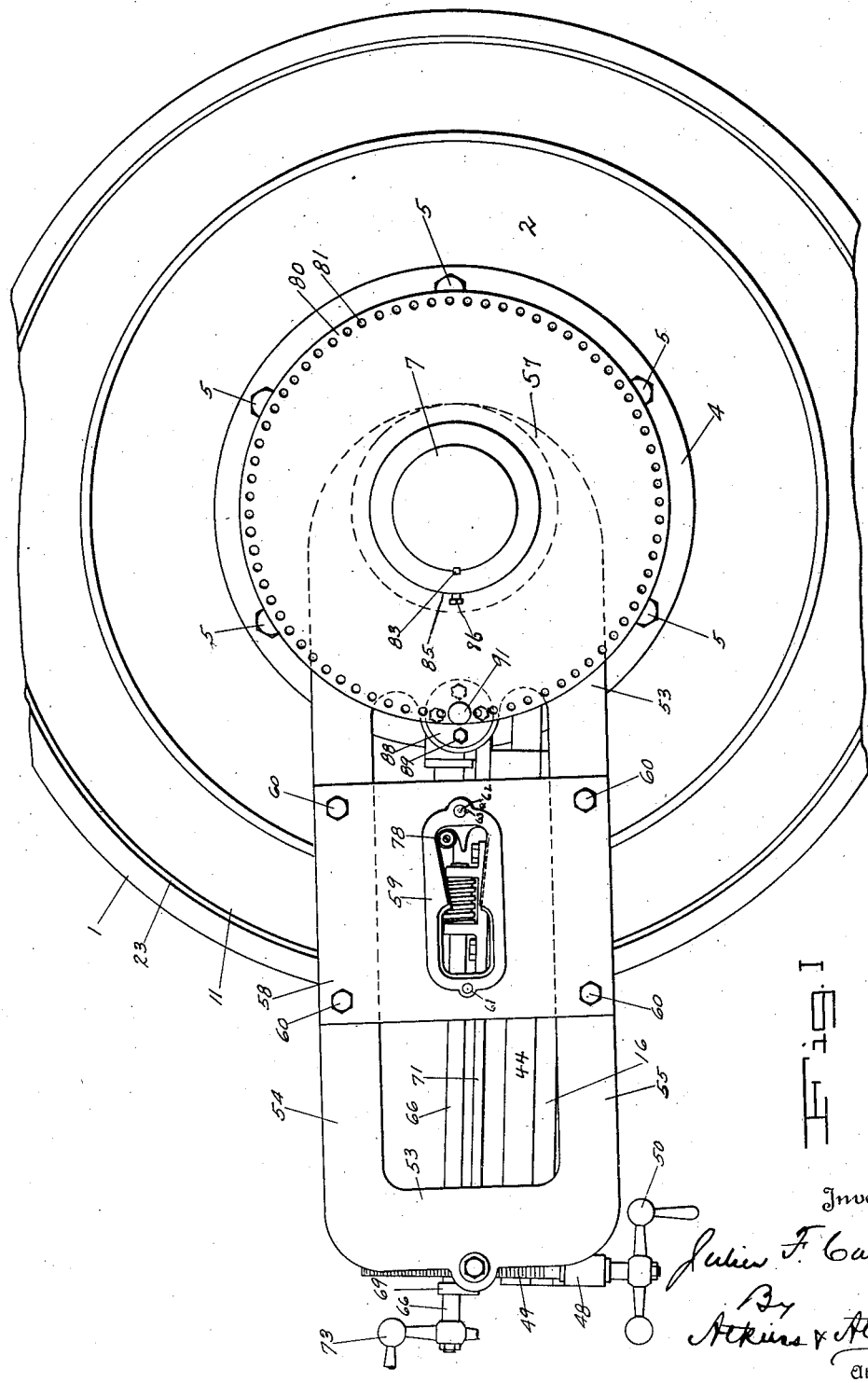

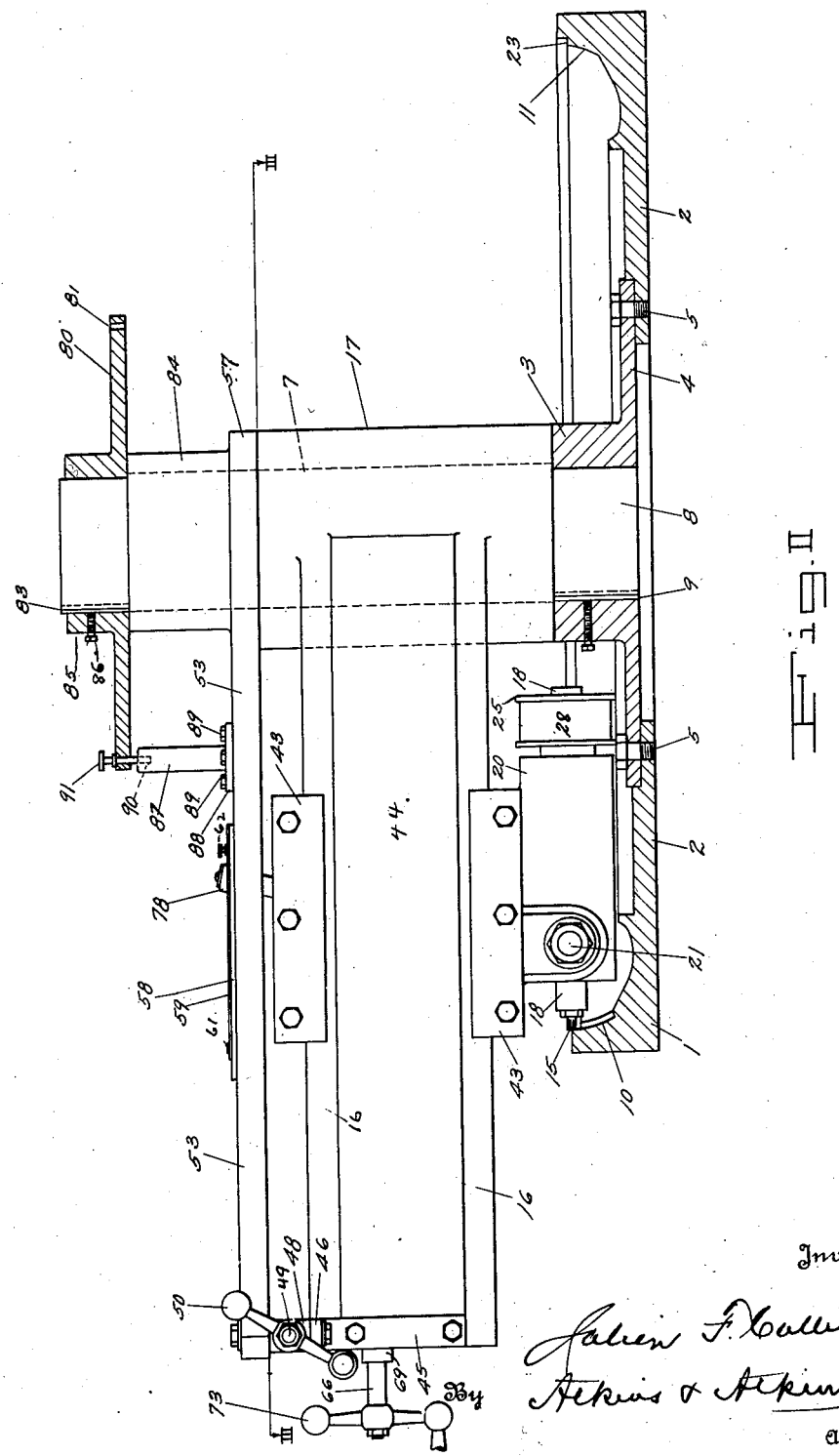

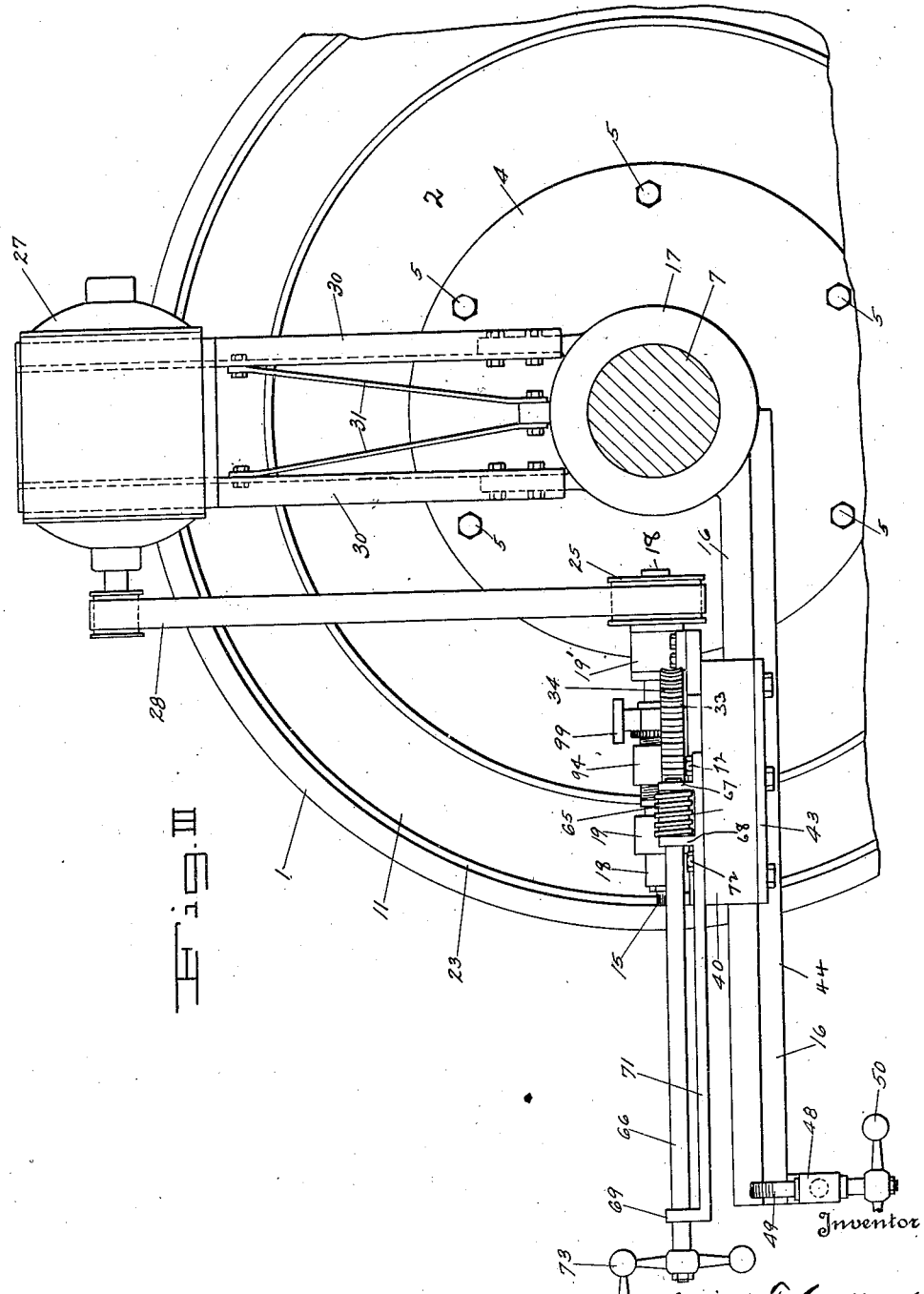

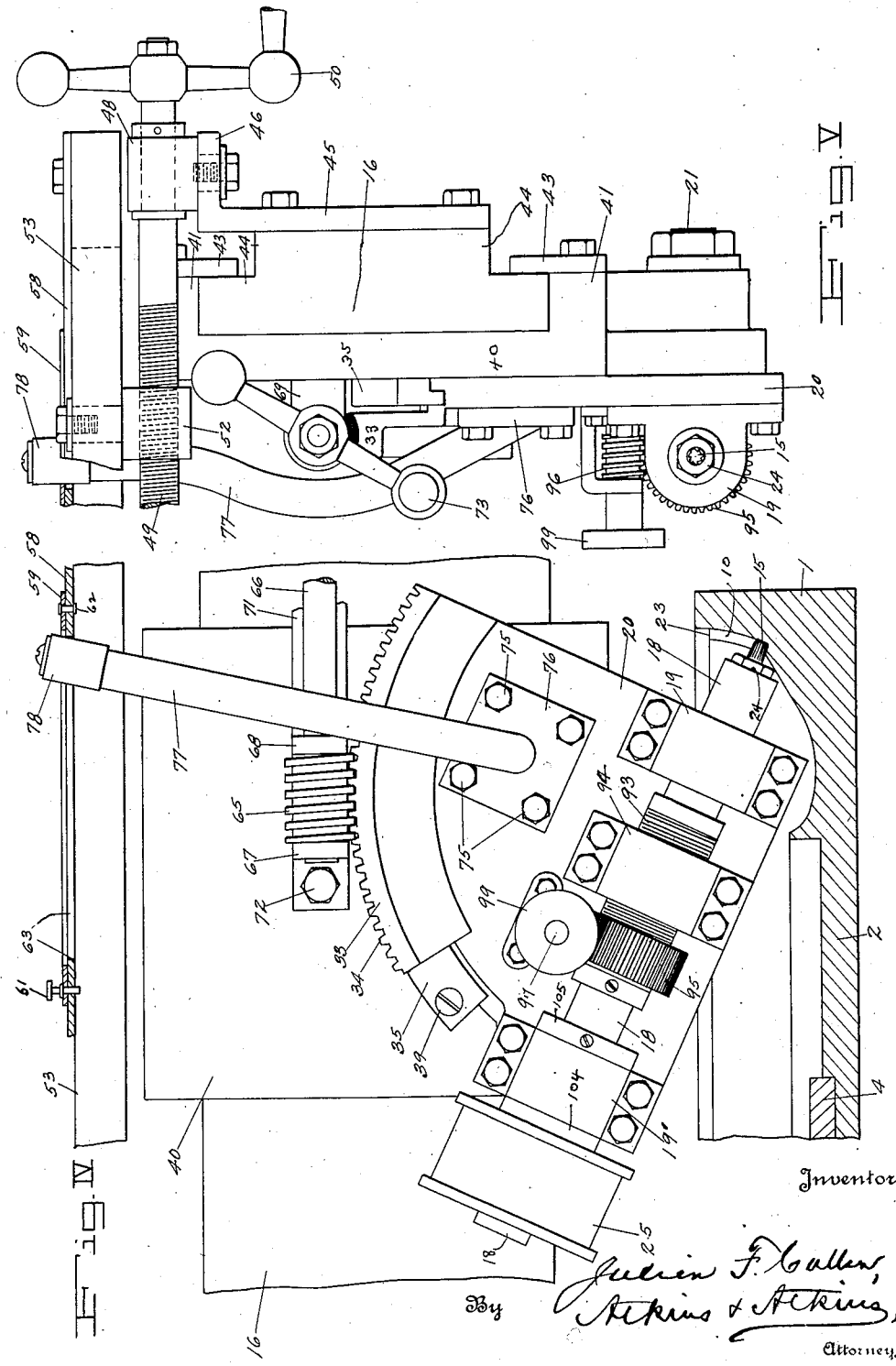

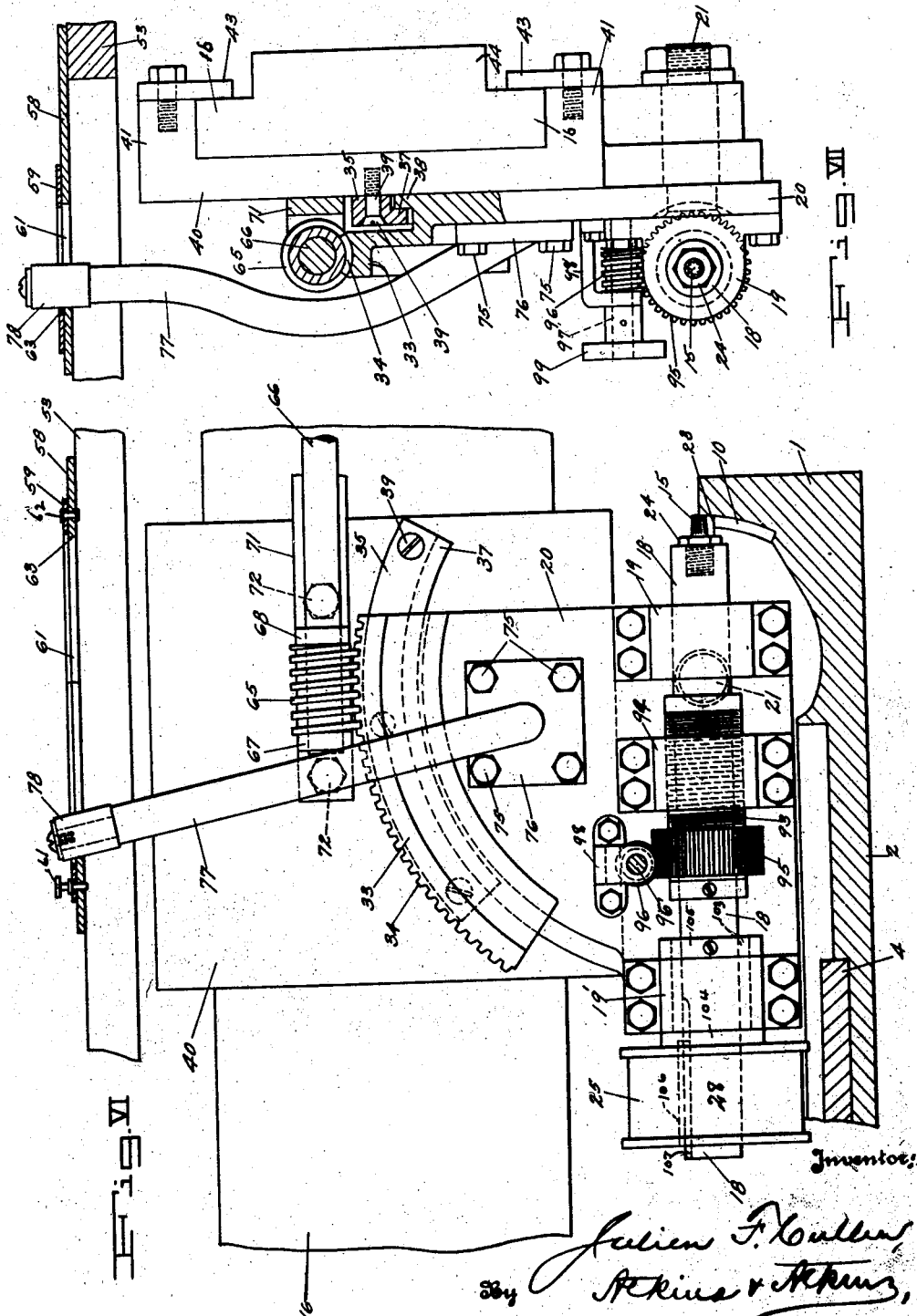

Patented Oct. 5, 1926.

1,601,999

UNITED STATES PATENT OFFICE.

JULIEN F. CULLEN, OF PORTLAND, OREGON.

TREAD-CUTTING MACHINE FOR TIRE MOLDS.

Application filed April 13, 1925. Serial No. 22,903.

My invention relates to machines for cutting "non-skid" grooves or patterns in metallic mold members for molding rubber tires.

Machines for cutting tire molds have been regarded hitherto as too expensive, both in respect to cost of production and, largely because of their functional limitations, in respect to their cost of operation. Besides, they have been uncertain in results obtained unless operated with greatest care and often despite the exercise thereof.

By my invention, I have produced a comparatively simple and cheap machine, which will do the work required of it as well as and in some respects better than the highest priced machine; which may be operated at a minimum of expense; which produces, with certainty and equality of distribution, any desired pattern of cut; and which is adapted, by mere change of its supporting base, to be applied to a mold member of any usual or practicable diameter preferred.

The further scope of my invention will be set forth in the following specification. What constitutes my invention will be hereinafter described in detail and succinctly defined in the appended claims.

In the accompanying drawings, in which my invention is illustrated in its present preferred form of embodiment, Figure I is a top plan view of my machine, which is, except motor, substantially complete, and is applied in operative relationship to a tire mold member, which is shown as broken away at its opposite sides for accommodation of the scale of the drawing to the sheet.

Figure II is a side elevation of the subject matter of Figure I, showing the base support of the machine, the tire mold member to which it is applied, and the dividing plate, respectively, in diametrical section.

Figure III is a horizontal section on the line III—III of Figure II, looking in the direction indicated by the darts thereon, portions of the latter figure being omitted.

Figure IV is a detail side elevation, partly in section, of the cutting-tool head substantially at the bottom of its cut, and parts of its operating mechanism, the same being shown as broken away from the rest of the machine whereof parts are illustrated.

Figure V is a companion view of Figure IV taken at right angles thereto, and in end elevation of a portion of Figure II, looking from left to right, some parts being in section, and some broken away.

Figure VI is a view corresponding to Figure IV, but showing the cutting-tool at the beginning of its cut, instead of advanced into it as shown in the last named figure.

Figure VII is an elevation partly in section of the subject matter of Figure VI, and at right angles thereto.

Figure VIII is a side elevation of a portion of the subject matter of Figure III taken at right angles to the latter plane of view.

Figure IX is a top plan view of the templet as shown in Figure I, the same being detached and partly broken away, with the auxiliary templet omitted.

Figure X is a fragmental plan view of a stretch of a tread-cut made by guidance of the cutting-tool effected by the form of templet shown in Figure IX.

Referring to the numerals on the drawings, 1 indicates a tire mold member or one half of a split mold, which represents the object upon which my cutting machine is designed and adapted to operate in the doing of its work.

In Figure I of the drawings, the mold member 1 is shown as a blank or an uncut one ready for cutting. The member 1 may be one half of the usual split type mold, and provided with an internal preferably annular flange 2. Within the inner circumference of the mold member 1, I provide a base support 3, which is secured snugly, firmly, and accurately to the surrounding mold member 1, so that the parts 1 and 2 are, with substantial exactitude, disposed coaxially one towards the other. To that end, the flange 2 may be provided with a depression into which snugly fits an annular footpiece 4, which is secured to the flange 2 by any suitable means, for example a ring of tap bolts 5.

Base supports 3 are made in practice of different heights and different diameters and are so adapted interchangeably to fit within different sizes of molds, according to any preferred standardization of size which may be adopted therefor in tire manufacture; but base supports of all sizes are, through their interchange, adapted equally to accommodate and operatively to support one and the same cutting machine.

Interchange of base supports 3, therefore, affords, without any other provision, means for adapting my machine to the cutting of treads for all sizes of tire molds. This, it should be noted, is an important and valuable feature of my invention.

The interchange of base supports 3, as aforesaid, is provided for simply by making each of such supports, irrespective of its size, in the form of a hub socket having sufficient weight and extent to furnish stable support to a post 7 whose reduced end 8 (Figure II) is fitted into the bore of said member 3.

A feather 9, or other mechanical device, may be employed at will for irrevolubly uniting the parts 3 and 8, they being also united preferably by a set screw as shown in Figure II.

The proper function of my machine is to cut grooves 10, of which one is shown, for example, in Figures II and VI of the drawings, in the tread-molding face 11 of the mold 1, said grooves being shaped and relatively disposed according to any predetermined pattern, such as that indicated, for example only, by the numeral 12 in Figure X of the drawings.

The cutting operation referred to in the last paragraph is performed by the direct instrumentality of a cutting-tool 15, or for brevity a cutter, which, in its step by step cutting progress, makes an operative sweep around the entire circumference of the mold member 1.

In this connection the reason for mounting the post 7 in firmly fixed coaxial relationship to the mold member 1 now begins to appear, since it is obvious that if the axis of the post 7 is made constantly to coincide with the central axis of the mold 1, it will be sufficient, in order to accomplish the end in view, properly to mount the cutter 15 on a member which will revolve co-axially about the said axis.

It will also be apparent that by so mounting the cutter it may be made to move about said axis in a circle of any desired diameter, thereby, in so far and without radical change of the machine, adapting, as already stated, the same cutting-tool to functionate upon mold members of various sizes regardless of what the diameter of each, within the working limits of the machine, may be. The height, also, of the post 7 should be varied in adapting the machine for cutting treads on molds of different sizes, but this may be accomplished by shipping the post in a base support 3 of a different height such as may be selected for the occasion.

With the foregoing suggestion of the reason for so doing, it is specified that the cutter 15 is operatively mounted upon a stiff horizontal beam 16 which projects radially from a rotatable bearing member or sleeve 17, with which it is preferably made integral. Said sleeve is supported by the upper face of the base support 3, and is revolubly but snugly fitted to the post 7, in the manner shown, for example, in Figure II.

The cutter 15 is carried immediately by an arbor 18 that is, in suitable bearings indicated by the numerals 19 and 19', journaled on a rocking carriage 20, that is movable upon a pivotal supporter 21 which is, in effect, provided for it on the beam 16, so as to impart through it oscillatory movement to the arbor 18 in the vertical plane with which the longitudinal axis of said arbor coincides.

The cutter 15 is shown as provided with only lateral cutting teeth, since the blank of the mold member 1, as it is shown in the drawing, is provided with a peripherical offset ledge 23, whose width measures the depth of the grooves 10, and into which in operation the teeth of the cutter bite.

If occasion require, the cutter, however, may be made to bore its own way into the metal of the mold as well as to cut, or besides cutting, laterally into it. This is of course an ordinary incident in the making of cutting tools to which it is deemed to be necessary only to allude in this connection, in order to indicate that such variation of tool is contemplated as coming within the scope of my invention, it being noted that the cutter is provided with an ordinary set-nut 24, by aid of which the cutter may be fixed in place or removed from its arbor as often as occasion for its renewal or replacement may occur.

The cutting-tool-arbor 18 is, as by a flanged belt-pulley 25, revolubly fixed to its end opposite to that to which the cutter 15 is fixed, driven by any suitable means such as will permit both the sleeve 17 and the beam 16 to revolve freely about the post 7 without any interfering with the operativeness of connection between the pulley 25 and its driver. A simple and therefore preferred form of such driving mechanism is shown, for example, in Figure VIII in which an electric motor 27 whose rotative shaft is operatively connected by a belt 28 with the pulley 25, the motor being mounted upon a platform or supporting frame 30 which is secured to the sleeve 17 and projects longitudinally therefrom substantially at right angles horizontally to the longitudinal axis of the arbor 18.

Brace rods 31, for example, fastened, respectively, at one end to the said sleeve and at the other end to the frame 30, serve to sustain the weight of said frame and of any motor it may be required to carry.

Reverting now to consideration of the rocking carriage 20, it is specified in further explanation of it that its function is to control and direct, to the extent of its vertical swinging movement, the lateral cutting operation of the cutter 15, whose connection with it has already been specified. Such swinging movement is positively imparted to the carriage 20 upon its pivotal supporter 21 by aid of any suitable mechanism which may be relied upon to accomplish the object desired. For the purpose, I prefer to construct the carriage 20 in the form and with the effect of a segmental gear, as is well shown in Figures IV and VI, and to provide it with an offset segmental rack 33 having worm teeth 34. The offset of the rack 33 is provided in order to accommodate the presence of a sector-plate 35 having an overhung flange 37 with which a lip 38, provided on the segmental edge of the carriage 20, slidingly engages, with the effect of steadying, to substantial rigidity, the oscillatory movement of the carriage. The plate 35 is, as by countersunk screws 39, fastened to the face of the traveler 40, which moves back and forth on the beam 16, and on which the carriage 20 is securely mounted. The preferred means for slidably attaching the traveler to the beam 16, are flanges 41 each having a height substantially equal to the thickness of the beam. The flanges 41 engage the opposite sides of the beam 16, and are held to it by overhanging plates 43, which are respectively bolted to a longitudinally extending, preferably integral strip 44 upon the beam 16. The precise construction of merely ordinary mechanical elements is, of course, offered, in the present instance as in all instances, preferentially only and by way of example.

The said strip 44 affords a suitable and conveniently disposed support for a bracket 45 (Figure V), that is bolted to it so as to present a shelf 46 for the firm support of a collar-bearing 48 in which rotates a longitudinally fixed shaft 49.

The shaft 49 is provided with a handle 50 by which it may be rotated at will in either direction. Its end opposite the handle 50 is threaded into a lug 52 (see Fig. V) which is preferably bolted to and projects, preferably downwardly, from the bottom of a frame 53 which is preferably bifurcated or U-shaped. The legs 54 and 55, respectively, of the frame 53, straddle and are secured to a common plate 57 which unites them and which collars the post 7 upon which it is free to rotate above the sleeve 17 (compare Figures I and II) under impulse in either direction imparted to it by rotation of the shaft 49.

A templet 58 spans, as shown in Figure I, the longitudinally disposed opening defined by the legs 54 and 55 in the U-shaped frame 53, to which it is secured as by bolts 60. On the top of the templet 58 is adjustably mounted an auxiliary templet 59 which while the machine is in operation is operatively fixed to the templet as by fastening members 61 and 62. The member 62 works in a transverse slot 63ª in the member 59 (see Figure I) for the purpose hereinafter explained.

The templet is penetrated by an opening that is bounded by a wall 63 the shape of whose periphery determines the pattern which, through the guidance imparted by it to the cutter 15, the operation of the machine produces.

The shape or configuration of the wall 63 may be considerably varied to an indefinite extent. Such shape of it as clearly shown in Figures I and IX will, as a result of operation of the machine in the proper manner and upon a proper object, produce a tread-cut if the pattern illustrated in Figure X, which is no more than a sample pattern and is so intended to be taken.

The manner in which the templet 58 and the auxiliary templet 59 functionate remains to be explained. For that purpose it is necessary to revert to description of the carriage 20 which has hitherto only specified that the segmental rack 33 thereof is provided with worm teeth 34. Extending that description, 65 indicates a worm which intermeshes with the teeth 34, as shown, for example in Figures IV and VI, and which is fixed longitudinally upon a rotative shaft 66 being disposed between two stop lugs 67 and 68, which serve also as journals to one end of said shaft as is well shown in Figure III. Near its other end, the shaft 66 is journaled, as shown in Figure III, in a third corresponding lug 69. The three journal lugs 67, 68, and 69, project from an elongated stiff supporting bar 71, which, at the end next to which the lugs 67 and 68 are located, is secured to the traveller 40, as by bolts 72. The shaft 66, where it extends beyond the lug 69 is provided with a handle 73, by which it may be rotated in either direction, with the effect of actuating at will, upon its pivotal supporter 21, the rocking carriage 20.

Now, to the carriage 20 is firmly secured as by bolts 75 a base plate 76 from which extends through the templet 58 into cooperative engagement with the templet wall 63, an arm 77 that is preferably bent for clearance of movement and provided with an antifriction roller 78 at its free end.

By proper manipulation of the handles 50 and 73, respectively, the roller 78 of the arm 77 may, the frame 53 being held stationary, be made to follow in close contact the contour of the wall 63 throughout its entire periphery, with the result, in the instance herein illustrated and described, of causing the cutter 15 to cut into the inner face 11 of the mold member 1, and to form therein the pattern which is illustrated and numbered 12 in Figure X of the drawings.

As has just been stated, it is necessary to keep the frame 53 stationary while the cutter 15 is functioning. For accomplishing that purpose, as well as for imparting step by step to the frame 53 rotative movement about the post 7, I prefer to employ a dividing plate 80 (compare Figures I, II, and VIII).

The dividing plate 80 is so denominated because its proper function is to divide into component parts the circle of rotation of the frame 53. Those parts should be equal, to the extent of substantial exactitude, because the patern 12, to effect whose production the division of the circle of rotation of the frame 53 is provided, is, in its completeness, of annular form, and is made up of repetitions of the same design constituting what may be called a sub-pattern, each of which is juxtaposed to its next neighbor on either side to make up such an entire series thereof as will complete the pattern 12.

It is obvious that in order to produce a symmetrically perfect pattern 12 each of the sub-patterns composing it must so exactly fill a definite equal space as to insure that there will be nowhere in the complete pattern 12 any break between the sub-patterns or any overlapping of them one upon another. This result is accomplished unerringly and to substantial perfection by my dividing plate 80. Moreover, the use of said plate makes it possible, at will, accurately to verify and correct, if need be, every cutting operation of the cutter 15 after it has been performed or has been intended to be performed, as will be clearly explained in the following description.

To effect the purpose just indicated, the plate 80 is provided near its outer periphery with a ring of apertures 81, each being spaced equidistantly from its next neighbor.

The plate 80 is feathered, as indicated at 83, or otherwise irrevolubly secured to the post 7, above a collar 84 which surmounts and is affixed to the frame 53.

The plate 80 is provided with a collar 85 for the purpose of conveniently fastening the plate to the post 7 as by aid of a set screw 86.

A stud-post 87, upstanding from the frame 53 and secured to it, as by aid of a foot-piece 88 and tap bolts 89, is provided in its top with a vertical peg-socket 90.

The axis of the socket 90 coincides with that of each aperture 81, at such time as they are successively brought into alignment by rotation of the frame 53. A removably adjustable peg 91 serves by its presence when it is inserted through any one of the apertures 81 into the socket 90, to fix the relation of the frame 53 to the plate 80. Readjustment of the peg from one aperture 81 to another imparts in regular order of advancement, a step by step relative disposition of the rotative frame 53 in respect to the dividing plate 80 which is fixed to the post 7 on which said frame rotates.

In addition to what is already specified, I prefer to provide mechanism for increasing or diminishing, the effective length of the arbor 18. To that end there may be employed the means, for example, illustrated in Figures IV to VII, inclusive, wherein the arbor 18 is shown as revolubly fixed but slidingly movable on the carriage 20. For that purpose a sleeve 93 which is rotatably confined at its opposite ends between collars 100 and 101 fixed to the arbor 18, is threaded through a box 94 bolted or otherwise secured to the carriage 20, so that through its rotation it may cause the arbor 18 which carries the cutter 15 to advance or retreat slidably in its bearings 19 and 19' with the result of lengthening or shortening in effect the arbor 18. For so rotating the sleeve 93 a worm gear 95 may be fixed to it in intermeshing relationship to a worm 96 which is fixed to a rotative shaft 97 mounted in suitable bearings provided for it in effect on the carriage 20 and in a suitable bracket 98 affixed to said carriage. A head 99, accessibly fastened to the shaft 97, is the means shown for manually imparting rotation thereto.

The arbor 18, although, in effect, slidable as above specified in its bearings 19 and 19' is preferably carried in the bearing 19' through the operative interposition between it and said bearing of a bushing. Said bushing preferably consists of the reduced end 103 of a coaxial integral sleeve 104 on the pulley 25. A collar 105 fixed to the reduced end 103 of the sleeve 104 serves to confine the pulley revolubly to the bearing 19'. The arbor 18 is slidable within but revolubly united to the pulley and its sleeve as by a feather 106 working in a longitudinal groove 107 in the arbor.

The following brief description will, in view of the foregoing specification, suffice to explain the operation of my machine.

Let it be assumed that a mold-member 1, intended to be subjected to the tread-cutting operation of my machine, is selected and fixed upon any suitable support or table that may be provided for its accommodation. Thereupon a base support 3, properly selected to suit the size of said mold-member, is bolted to it, as has been hereinbefore specified. Afterwards the cutter 15 is operatively applied with cutting effect upon the member 1, through manipulation by the operator of the handles 50 and 73, the dividing plate 80 being set in step by step advancement of rotation as the cutting operation proceeds.

When the pattern 12, for example, has been completely cut, the machine has performed the work it is required to do, and is ready to be put to work on another mold-member 1 after the latter shall have been substituted for the completed one just named.

It is not indispensably necessary for the operator to be certain each time he inserts the peg 91 into an aperture 81, that said aperture is the next successive one in the series of such apertures. It may, in fact, be any one of the series without disturbing, in any wise, the work of the machine, and therefore, if the operator should skip one or more of the apertures 81 in series, he may, upon inspection of the cut mold-member 1, at any time rectify any oversight in that respect which may have occurred in the sequence of cutting operations, without injuriously affecting the work put out by the machine. Moreover, the operator, after he deems a job complete may inspect it, and if he finds any defect or omission in it may instantly apply the cutter 15 to correct or remove the same.

It remains to be explained that the auxiliary templet 59 is provided as a means for cutting certain patterns, for example 12, whereby a slight deviation of movement from the templet 58 may be imparted to the roller 78 with corresponding effect upon the cut made by the cutter 15, with the result of effecting a clean cutting away of the metal. The use of the auxiliary templet is not necessary in the cutting of all designs of tread patterns. Where it is found necessary or convenient to employ it, it is, by manipulation of the member 62, swung in one direction or the other upon the member 61 as a pivot with the effect of affording mechanical guidance to the roller 78 for throwing it slightly out of the line of travel which would be imparted to it by engagement with the wall 63 of the templet 58.

What I claim is:—

1. In a machine of the kind described, the combination of a base adapted to be detachably secured to and mounted on the mold member to be cut, a cutter supported by said base and adapted to be moved bodily circumferentially of the mold member, means for adjusting the cutter radially of the mold and about an axis extending transversely of the axis about which it is moved circumferentially of the mold, a template controlling movement of the cutter about said transversely extending axis, and means for actuating the cutter in any adjusted relation.

2. In a machine of the kind described, the combination of a base adapted to be detachably secured to the mold member to be cut and having a post arranged in coaxial relation to the mold member, a cutter supporting arm adapted to be adjusted about the post as an axis to vary the position of the cutter circumferentially of the mold member, means supported by the post adjacent its outer end for cooperating with the cutter supporting arm to retain the arm in the desired position circumferentially of the mold, a rotatable cutter mounted on said arm, and means for actuating the cutter.

3. In a machine of the kind described, the combination of a base adapted to be detachably secured to the mold member to be cut and having a hub arranged in coaxial relation to the mold member; a post having one end fitted in said hub, an arm rotatably connected at one end to said post and extending radially therefrom, a cutter carriage mounted on said arm to reciprocate longitudinally thereof, a cutter supported by said carriage to rock about an axis extending transversely of the arm, means for holding said arm in any one of a plurality of predetermined positions circumferentially of the mold member, and means for actuating the cutter.

4. The combination with a machine as described in claim 3, of a circular mold member having an internal annular flange coaxial with said member and adapted automatically to center any base support of said machine so as to constitute the mold member an operative support for the machine.

5. In a machine of the kind described, the combination of an upright or post, means for supporting said post in a position coaxial with a circular mold member, an arm mounted to rotate about the post, means for retaining said arm in a position extending in any desired radial direction from the post comprising a disk fixed to the post and provided with a series of circumferential equally spaced apertures, a pin adapted to be passed through any of said apertures and means on the arm for engaging the pin, a cutter carried by said arm, and means for actuating the cutter.

6. In a machine of the kind described, the combination with a base support, an arm extending radially from and adjustable about a post on said base, a traveller engaging said arm, means for moving the traveller longitudinally of the arm, a cutter carrier supported by and depending from the traveller, means for rocking the carrier about an axis extending transversely of the length of the supporting arm, a rotatable cutter mounted in said carrier, means for rotating the cutter, a template on said supporting arm, and means on the carriage contacting with the template, for the purpose described.

7. In a machine of the kind described, the combination with a base support, cutter-operating mechanism comprising a revoluble arm, a vertically rocking carriage on said arm, and a rotative cutting-tool arbor mounted on the carriage, of driving mechanism for rotating the arbor, means for operatively imparting motion to the carriage from and towards the base support in a direction radial to the vertical axis of said revoluble arm, a templet, supported above the path of travel of the carriage, a guide arm on the carriage having a free end adapted to follow the contour of the templet, and manipulative means for causing operative engagement between said arm and templet with the effect of directing the cutting operation of the cutting-tool.

8. In a machine of the kind described, the combination with a base support, cutter-operating mechanism revolubly mounted thereon and comprising a vertically rocking carriage, and a rotative cutting-tool arbor mounted on the carriage, of driving mechanism for rotating the arbor, means for operatively imparting motion to the carriage from and towards the base support in a direction radial to its vertical axis, a templet, a movable auxiliary templet, a guide arm on the carriage having a free end adapted to follow the contour of the templet, and manipulative means for causing operative engagement between said arm and one of said templets with the effect of directing the cutting operation of the cutting-tool.

9. In a machine of the kind described, the combination with a post, and means for securing it in operative relationship to a member to be operated upon, of a radially disposed beam revolubly mounted thereon, a dividing plate fixed to the post, above the beam, means for operatively uniting the plate to the beam for effecting a step by step adjustment of the beam to the post in the plane of rotation of the beam, a cutting-tool arbor operatively mounted on the beam, means for directing at will operative movement of the arbor on the beam, and driving mechanism for rotating the arbor.

10. In a machine of the kind described, the combination with a post, and means for securing it in operative relationship to a member to be operated upon, of a radially disposed beam revolubly mounted thereon, a traveller, means for adjustably positioning the traveller longitudinally upon the beam, a rocking carriage carried by the traveller, means for imparting vertical swinging movement to the carriage, a cutting-tool arbor operatively and slidably mounted on the carriage, driving mechanism for said arbor in operative communication therewith in any position it may assume in its rotation about the post, and mechanism for imparting longitudinal operative adjustment to the arbor, said mechanism consisting of a sleeve rotatably fixed to the arbor, a worm gear fixed to the sleeve, and a manipulative worm meshing with the worm gear.

In testimony whereof, I have hereunto set my hand.

JULIEN F. CULLEN.